US009924424B2

(12) United States Patent
Chuberre et al.

(10) Patent No.: US 9,924,424 B2
(45) Date of Patent: Mar. 20, 2018

(54) INTEGRATED RADIO COMMUNICATIONS SYSTEM USING AN ORDERED HIERARCHICAL CELLULAR COVERAGE

(71) Applicant: THALES, Courbevoie (FR)

(72) Inventors: Nicolas Chuberre, Toulouse (FR); Cyril Michel, Toulouse (FR); Laurent Combelles, Toulouse (FR); Thibaud Calmettes, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/430,243

(22) Filed: Feb. 10, 2017

(65) Prior Publication Data
US 2017/0245185 A1    Aug. 24, 2017

(30) Foreign Application Priority Data
Feb. 22, 2016  (FR) .................................... 16 00304

(51) Int. Cl.
*H04W 36/04*    (2009.01)
*H04W 72/04*    (2009.01)
(Continued)

(52) U.S. Cl.
CPC ........ *H04W 36/04* (2013.01); *H04B 7/15507* (2013.01); *H04H 20/38* (2013.01);
(Continued)

(58) Field of Classification Search
CPC .......................... H04B 7/18563; H04W 16/14; H04W 76/066; H04W 28/20; H04W 28/26;
(Continued)

(56) References Cited

U.S. PATENT DOCUMENTS

| 2002/0090942 | A1* | 7/2002 | Karabinis | .......... | H04B 7/18563 |
| | | | | | 455/427 |
| 2002/0146979 | A1* | 10/2002 | Regulinski | ......... | H04B 7/18513 |
| | | | | | 455/13.1 |
| 2005/0260948 | A1* | 11/2005 | Regulinski | ......... | H04B 7/18513 |
| | | | | | 455/12.1 |
| 2008/0287124 | A1* | 11/2008 | Karabinis | .......... | H04B 7/18536 |
| | | | | | 455/427 |

(Continued)

OTHER PUBLICATIONS

"Satellite Earth Stations and Systems (SES); Advanced satellite based scenarios and architectures for beyond 3G systems," Technical Report, European Telecommunications Standards Institute (ETSI), vol. SES MSS, No. V1.1.1, Mar. 1, 2010, XP014046267.
(Continued)

*Primary Examiner* — Dung Hong
(74) *Attorney, Agent, or Firm* — Baker & Hostetler LLP

(57) ABSTRACT

An integrated radio communication system with ordered hierarchical cellular coverage comprises a first system and a second system, the coverage of the second system covered by the coverage of the first system, and a set of dual-mode terminals that can selectively use the first system or the second system. The first and second systems are configured to simultaneously share a common portion Bc of a first band B1 of frequencies respectively on a first uplink and a second uplink, and respectively manage first transmission resources and corresponding second transmission resources. The second radio communication system of lower level N2 is free to manage its second transmission resources without any coordination constraint with respect to the first system of higher level N1, whereas the first system of higher level is configured to not disturb the second system in the common frequency band portion. The first system is configured to transmit data packets on a first uplink random access contention channel and to manage its first resources optimally in terms of transmission capacity of the channel as a function of the measurement of the occupancy of the second radio resources currently used by the second system and of the first resources currently used by the first system.

16 Claims, 7 Drawing Sheets

(51) Int. Cl.
H04L 12/26 (2006.01)
H04W 16/32 (2009.01)
H04B 7/155 (2006.01)
H04H 20/38 (2008.01)
H04W 28/26 (2009.01)
H04W 28/04 (2009.01)
H04W 88/06 (2009.01)
H04W 74/08 (2009.01)

(52) U.S. Cl.
CPC ......... *H04L 43/0882* (2013.01); *H04W 16/32* (2013.01); *H04W 28/044* (2013.01); *H04W 28/048* (2013.01); *H04W 28/26* (2013.01); *H04W 72/0486* (2013.01); *H04W 74/0833* (2013.01); *H04W 88/06* (2013.01)

(58) Field of Classification Search
CPC ............ H04W 72/0413; H04W 88/06; H04W 72/1284; H04L 47/14
See application file for complete search history.

(56) References Cited

U.S. PATENT DOCUMENTS

2009/0088164 A1* 4/2009 Shen ............... H04B 7/155 455/436
2009/0131046 A1* 5/2009 Karabinis ......... H04B 7/18563 455/427
2013/0190000 A1* 7/2013 Boudreau ............ H04W 16/26 455/449
2014/0274103 A1* 9/2014 Steer ............... H04W 16/14 455/454

OTHER PUBLICATIONS

"Detailed specifications of the satellite radio interfaces of International Mobile Telecommunications—Advanced (IMT-Advanced)," Recommendation ITU-R M.2047-0, International Telecommunication Union, Dec. 2013.

* cited by examiner

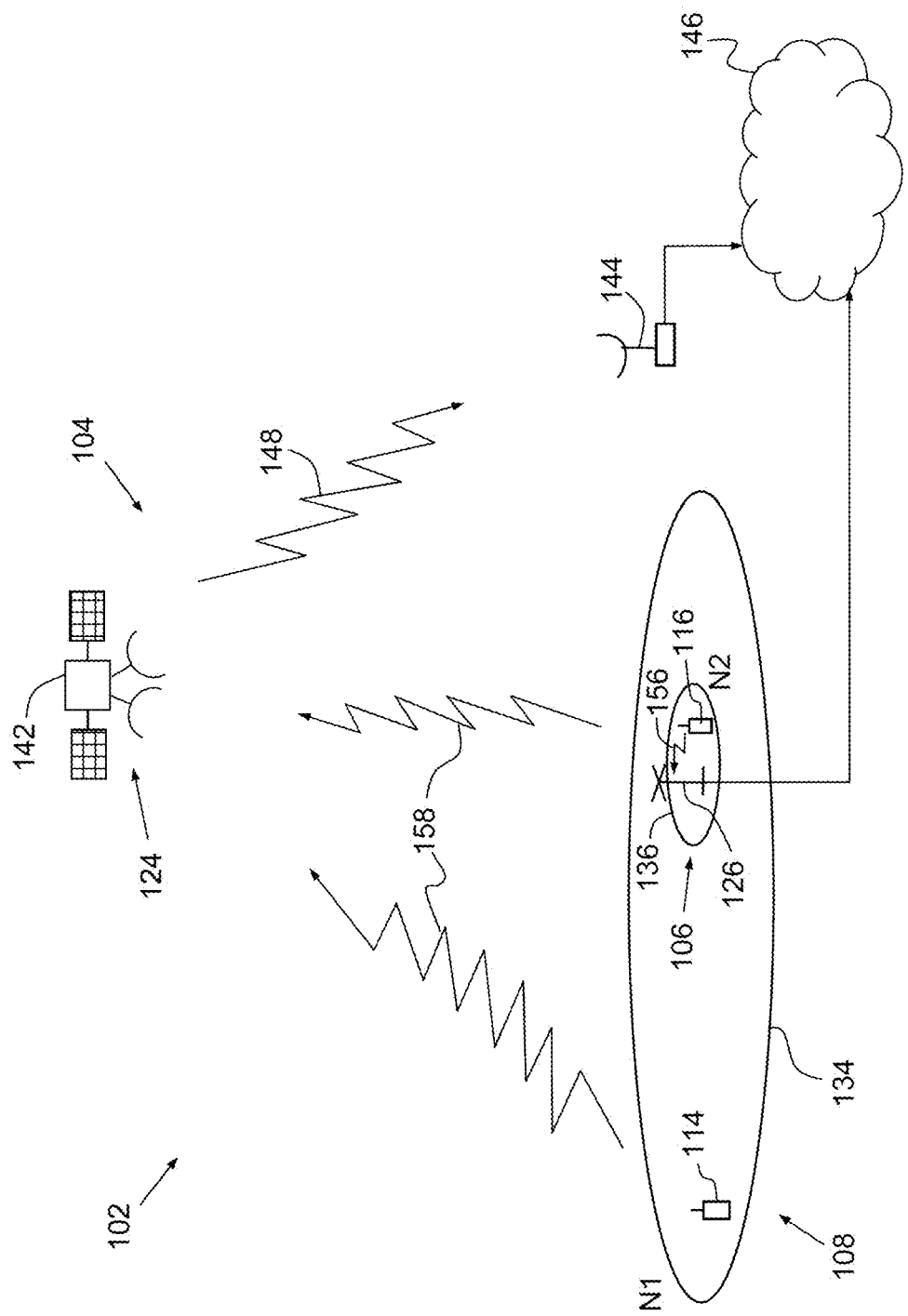

INTEGRATED RADIO COMMUNICATIONS SYSTEM USING AN ORDERED HIERARCHICAL CELLULAR COVERAGE

CROSS-REFERENCE TO RELATED APPLICATIONS

This application claims priority to foreign French patent application No. FR 1600304, filed on Feb. 22, 2016, the disclosure of which is incorporated by reference in its entirety.

FIELD OF THE INVENTION

The present invention relates to an integrated radio communication system with ordered hierarchical cellular coverage or with umbrella cells, including in particular a satellite system, integrated in terms of complementing coverage with one or more terrestrial cellular radio communication systems with cells of smaller size.

Such an integrated system is configured to route in particular asymmetrical data traffic, loaded mostly on the uplink of the cells.

The present invention relates also to a cellular radio communication method for routing in particular asymmetrical data traffic loaded mostly on the uplink, the radio communication method being implemented by the integrated radio communication system with umbrella cells by allowing optimum operation of the spectral resources available at each coverage level.

BACKGROUND

The cellular radio communication networks are currently diversifying in order to support not only the conventional voice, video and internet services but also the increasing traffic of communications from machines or things. The internet of things IoT is booming and addresses a multitude of fields of applications, some of which demand a service of high reliability over global coverage. Thus, in the transport domain, the communications between machines make it possible to remotely track and monitor merchandise routed by sea, air and/or land.

The issue in communications between machines is therefore to offer ubiquity of service at lower cost and with the fastest possible infrastructure deployment time.

This ubiquity of service is also an issue for certain critical low bit rate applications which require high service availability, such as security telecommunications for example.

Thus, the integration of a satellite component in the terrestrial cellular networks is sought to meet the need for ubiquity of these new IoT services characterized more often than not by sporadic data traffic at low bit rate transmitted in bursts.

The integration of a satellite component is a solution that is well known to meet the need for ubiquity of the conventional voice, video and internet services.

A first family of current satellite communication solutions is based on the use of geostationary satellites, which offer the global coverage and the service reliability required for these conventional services. However, in comparison to the terrestrial networks, the geostationary network infrastructures are also known for their high service cost and terminal costs and for a relatively mediocre performance in terms of quality of service and of latency.

The degradation of the latency is linked to a significant information transit time due to the distance separating the satellite from the surface of the earth, which can negatively impact the quality of service for the real-time applications.

The degradation of the quality of service for a geostationary satellite system can also be due to a lack of space diversity and to the stationary nature of the propagation path between a user terminal and the satellite. When a propagation path is subject to strong attenuations, even blocked, and if the terminal is fixed, these propagation conditions will not change. The data cannot be transmitted, without moving the terminal itself.

A second family of current satellite communication solutions is founded on the use of satellites organised in constellations and moving in non-geostationary or non-geosynchronous orbits NGSO. Among the NGSO systems, the satellite systems using satellites in low earth orbits LEO, such as the commercial global star or iridium systems, make it possible to reduce the latency through a low transit time and improve the quality of service through a dynamic diversity of the propagation conditions offered by the satellites in view of the LEO constellation.

In these two families of solutions, the service cost is linked to the limited capacity of the infrastructure and of the spectrum allocated to the mobile satellite service MSS accessible in particular below 3 GHz.

In these two families of solutions, the terminals are dual-mode terminals, in as much as they are configured to communicate by choice with the satellites via a first wireless interface or with the relay stations of a terrestrial cellular network via a second wireless interface.

Notwithstanding the fact that the relatively limited market, addressed by these commercial satellite systems does not incentivize the terminal manufacturers to diversify their range of products, or seek to reduce their costs and/or their footprints a first variant and a second variant of integration of the satellite component and of the terrestrial cellular component for supplying conventional services have been proposed in order to make the production of the dual-mode terminals more attractive.

According to the first variant, the radio interface of the cellular network is re-used in the satellite system by making the links between the terminals and the satellites operate in a specific frequency band, close to the much wider MS (Mobile Service) service band allocated to the terrestrial cellular system. The impact on the terminals is thus limited to the radio stage which must if necessary extend its frequency band, even with a few protocol modifications (for example modifications concerning the power control protocol, the synchronisation mechanism, the contention-based access protocol) to allow optimal operation in the geostationary satellite system. Such a variant is described by the international telecommunications union ITU in the document published under the reference ITU-R recommendation M.2047-0(12/2013), entitled "Detailed specifications of the satellite radio interfaces of International Mobile Telecommunications—Advanced (IMT Advanced)".

It is noteworthy that this first variant can be generalised to two infrastructures of a system which use different spectra and the access to the spectrum is without mutual constraint.

According to the second variant, an integrated satellite/cellular system operating in the MSS (Mobile Satellite Service) frequency bands allocated specifically to the mobile satellite services could be developed. However, it is not possible to simultaneously use the same MSS satellite frequency band (Mobile Satellite Service band) on one and the same coverage area shared by the satellite component and the terrestrial cellular component. The risk is that of creating satellite service exclusion areas around the terrestrial base stations or of reducing the effective range of the base stations. It is then accepted practice to provide a frequency re-use scheme at the satellite level which then constrains the use of the spectrum at the terrestrial cellular level. The management of the spectrum of this system thus has to be under the control of satellite operators, which does not incite the support of the terrestrial cellular operators and, consequently, does not interest the manufacturers of cellular terminals.

It is noteworthy that this second variant can be generalized to a system in which a lower level re-uses the spectrum not used by a higher level under the control of the operator of the higher level.

Thus, according to these two variants, the size of the accessible market or the operation conditions do not incite the manufacturers of terminals to launch into the production of these dual-mode terminals despite a relatively low increase in the proportion of the recurrent production costs of the dual-mode terminals.

However, here, and unlike the conventional services in which the traffic load prioritizes the traffic volume on the downlink over the uplink and the downlink, the new internet of things IoT services for which the seamless extension of the coverage is sought are characterized by an asymmetrical traffic load, mostly on the uplink, and an uplink traffic component obeying sporadically a low bit rate data burst transmission law.

Here, the aim is to determine, in this case, an architecture of a satellite system which allows for a seamless extension of the coverage area of the terrestrial cellular networks, in particular of the fourth generation 4G networks or of the fifth generation 5G networks, for communications between things and a maximum use of the spectrum allocated to the terrestrial cellular networks outside of the totality of the coverage areas of the terrestrial cellular networks.

Generally, the technical problem is how to increase the transmission capacity on the uplink of a radio communication system with one or more umbrella cells, integrated in terms of complementing coverage, with one or more terrestrial cellular radio communication systems with cells of smaller size, and configured to route asymmetrical data traffic corresponding to communications between things, loaded mostly on the return channel of the radio communication system with umbrella cells.

Additionally, a second technical problem is how to reduce the complexity of the dual-mode terminals capable of selectively accessing the radio communication system with umbrella cells and terrestrial cellular networks as a function of its geographic position and/or observed propagation conditions.

SUMMARY OF THE INVENTION

To this end, the subject of the invention is an integrated radio communication system, with ordered hierarchical cellular coverage, in which a cell of higher level coverage covers one or more cells of lower level. Said integrated system comprises:
a first radio communication system having a first coverage level N1 and a first relay station and a second radio communication system having a second coverage level N2 and a second relay station, the first coverage level N1 being higher than the second coverage level N2; and
a set of dual-mode terminals, configured to selectively use the first system or the second system.

The integrated system is characterized in that:
the first system and the second system are configured to simultaneously share a common portion Bc of a first frequency band B1 respectively on a first uplink for access to the first relay station and a second uplink for access to the second relay station and respectively manage first shared transmission resources and second transmission resources which use the common portion Bc of the first band B1; and
the second transmission system of lower level N2 is free to manage its second transmission resources without any coordination constraint with respect to the first system of higher level N1, and
the first system of higher level N1 is configured to not disturb the second system in the common frequency band portion Bc.

The integrated system is also characterized in that the first system is configured to transmit data packets on a first uplink random access contention channel and to manage its first resources on said random channel, characterized by time slots and/or frequency slots and/or access codes, optimally in terms of transmission capacity of the random channel,
by measuring at the first relay station, the transmission resource occupancy of the second radio resources currently used by the second system and of the first shared resources currently used by the first system, then
by determining, as a function of the measurement of the occupancy in terms of transmission resources of the second radio resources currently used by the second system and of the first shared resources currently used by the first system, the first resources in terms of time slots and/or frequency slots and/or access codes to be used by new dual-mode terminals not located in the cellular coverage of the second system, so as to optimize the transmission capacity of the random channel; then
by notifying, using a signalling channel broadcast on the downlink to the dual-mode terminals involved, not located in the cellular coverage of the second system, the first resources to be used and determined previously.

According to particular embodiments, the integrated radio communication system with ordered hierarchical cellular coverage comprises one or more of the following features:
the first relay station of the first system comprises:
a device for measuring the spectral occupancy of the second radio resources currently used by the second system, by determining the average energy received in a plurality of basic frequency channels from a wavelet transform or a Fourier transform of the energy received from a beam of reception-mode coverage of the receiving antenna of the first relay station; and/or
a device for measuring the distribution over all the access codes and all the slots of the energy received from a reception beam of the receiving antenna corresponding to the second radio resources currently used by the second system;
when the first relay station is mobile relative to the dual-mode terminals, the first relay station of the first system comprises a device for measuring a geographical distribution of the spectral occupancy received by one or more overlapping reception beams, determined from a plurality of spectral occupancy profiles measured at different instants along the trajectory and from a predictive model of said trajectory;
the first system is configured to manage first additional resources using a second band B2 of frequencies reserved exclusively for the first uplink and the first shared resources using the common portion Bc of the first band B1, characterized by time slots and/or frequency slots and/or access codes, optimally in terms of maximum transmission capacity of the random channel and of minimization of the rate of collision on the random channel, by measuring, on the first relay station, the occupancy of the second radio resources currently used by the second system and of the first shared resources currently used by the first system, then by determining, as a function of the measurement of the occupancy of the second radio resources currently used by the second system and of the first shared resources currently used by the first system, the first resources in terms of time slots and/or frequency slots and/or access codes to be used by new dual-mode terminals, not located in the cellular coverage of the second system, so as to optimize the transmission capacity of the random channel and to minimize the rate of collision on the random channel; then by notifying, using a signalling channel broadcast on the downlink to the dual-mode terminals involved, not located in the cellular coverage of the second system, the first resources to be used and determined previously;

the first system is configured to distribute the first shared resources of the common portion of the first band and the first additional resources exclusively reserved for the first system, so as to minimize the collisions between two terminals accessing the first system via the first uplink by using the same first resource of the first band or of the second band in a cell of first level coverage;

the first system is configured to distribute the first shared resources of the common portion of the first band and the first additional resources exclusively reserved for the first system, so as to minimize the collisions between two terminals accessing, for one of them, the first system via the first uplink and, for the other one, the second system via the second uplink, and all using the same first shared resource of the common portion of the first band;

the first system is configured to distribute the first shared resources of the common portion of the first band and the first additional resources of the second band exclusively reserved for the first system, so as to minimize the indiscriminate collisions of the data packets received on the first uplink, the discrimination method being included in the set formed by: the general joint maximum likelihood sequence estimation (JMLSE) technique, the general synchronous successive interference cancellation (SIC) technique which separates two signals as a function of a power difference existing between said two signals, the asynchronous successive interference cancellation technique which separates two signals having the same symbol rate as a function of a time offset by a fraction of a symbol period existing between said signals; the JMSLE and SIC techniques applied in the case where the contention-based random access protocol uses a contention resolution diversity slotted ALOHA (CRDSA) protocol, the spatial separation technique when the relay station of the first system comprises an antenna with adaptive electronic scan, determined as a function of the characteristics of the signals received, or with deterministic scan, predetermined as a function of criteria including a date, a geographical position, and a preferred direction of the antenna;

the first system comprises a receiver configured to implement a combined processing of the signals originating from a plurality of cells of first level coverage, and the first system is configured to distribute the first shared resources of the common portion of the first band and the first additional resources of the second band exclusively reserved for the first system, so as to minimize the indiscriminate collisions of the data packets received by the multi-beam receiver, the discrimination method being based on the difference in received power of the signals originating from different cells of first level coverage, and included in the set formed by the general joint maximum likelihood sequence estimation (JMSLE) technique, the general synchronous successive interference cancellation (SIC) technique, the asynchronous successive interference cancellation technique, the JMSLE and SIC techniques applied in the case where the contention-based random access protocol uses a contention resolution diversity slotted ALOHA (CRDSA) protocol, and the spatial separation technique when the relay station of the first system comprises an antenna with electronic scan;

the discrimination method is also based on the difference in time, frequency, power, direction of arrival of the beam of the signals originating from the signals originating from different cells of first level coverage;

the first and second systems comprise, in common, a receiver configured to implement a combined processing of the signals originating from a cell of first level coverage and from at least one cell of second level coverage, and the first system is configured to distribute the first shared resources of the common portion of the first band and the first additional resources of the second band exclusively reserved for the first system, so as to minimize the indiscriminate collisions of the data packets received by the multi-beam receiver, the discrimination method being based on the difference in time, frequency, power, direction of arrival of the beam, of the signals originating from the cell of first level coverage and from the at least one cell of second level coverage, and included in the set formed by: the general joint maximum likelihood sequence estimation (JMLSE) technique, the general synchronous successive interference cancellation (SIC) technique, the asynchronous successive interference cancellation technique, the JMSLE and SIC techniques applied in the case where the contention-based random access protocol uses a contention resolution diversity slotted ALOHA (CRDSA) protocol, and the spatial separation technique when the relay station of the first system comprises an antenna with electronic scan;

the first and second systems are configured to route sporadic data traffic for inter-machine communication applications;

the first system is a satellite radio communication system comprising and using at least one satellite in geostationary orbit (GSO) or non-geostationary orbit (NGSO), and the second system is a radio communication system comprising one or more networks of relay stations out of the high-altitude platform stations (HAPS), the base stations serving macro cells, the base stations serving micro, pico or femto cells; or the first system is a high-altitude radio communication system comprising and using at least high-altitude platform stations (HAPS), and the second system (106) is a cellular radio communication system comprising one or more networks of relay stations out of the base stations serving macro cells, the base stations serving micro, pico or femto cells; or the first system is a cellular radio communication system comprising one or more networks of relay stations included among the base stations serving macro cells, and the second system is a cellular radio communication system comprising one or more networks of relay stations included among the base stations serving micro, pico or femto cells;

the first system is a satellite radio communication system comprising and using a constellation of satellites moving in low earth orbits (LEO);

the integrated radio communication system with ordered hierarchical cellular coverage is configured to implement the functionalities of a 5th generation multi-vendor radio communication system combining the use of base stations serving cells out of the micro, pico and femto cells, base stations serving cells of macro cell type, high-altitude platform stations HAPS and non-geostationary or geostationary satellite systems.

Another subject of the invention is a cellular radio communication method, implemented by an integrated radio communication system with ordered hierarchical cellular coverage in which a cell of higher level coverage covers one or more cells of lower level. The integrated radio communication system comprises:

a first radio communication system having a first coverage level N1 and a first relay station and a second radio communication system having a second coverage level N2 and a second relay station, the first coverage level N1 being higher than the second coverage level N2; and a set of dual-mode terminals, configured to selectively use the first system or the second system.

The first system and the second system are configured to simultaneously share a common portion Bc of a first band B1 of frequencies respectively on a first uplink for access to the first relay station and a second uplink for access to the second relay station, and respectively manage first shared transmission resources and second transmission resources which use the common portion Bc of the first band B1. The second radio communication system of lower level is free to manage its second transmission resources without any coordination constraint with respect to the first system of higher level, and the first system of higher level N1 being configured to not disturb the second system in the common frequency band portion. The radio communication method is characterized in that it comprises the steps consisting in that:

in a first step, a first set of dual-mode terminals connected to the first system transmit data packets on a first uplink random access contention channel by using first shared resources of the common portion Bc of the first band, and a second set of terminals, connected to the second system, use second resources of the common portion Bc of the first band B1; then in a second step, the first system measures, on the first relay station, the occupancy of the second radio resources currently used by the second system and of the first shared resources currently used by the first system; then in a third step, as a function of the measurement of the occupancy of the second radio resources currently used by the second system and of the first shared resources currently used by the first system, the first system determines the first shared resources in terms of time slots and/or frequency slots and/or access codes to be used by new dual-mode terminals not located in the coverage of the second system so as to optimize the transmission capacity of the random channel; then in a fourth step, the first system notifies, using a signalling channel broadcast on the downlink to the dual-mode terminals, not located in the coverage of the second system, the relevant information concerning the first resources to be used and determined in the third step.

According to particular embodiments, the cellular radio communication method comprises one or more of the following features:

the first system is configured to manage first additional resources using a second band of frequencies reserved exclusively for the first uplink and the first shared resources using the common portion Bc of the first band B1, characterized by time slots and/or frequency slots and/or access codes, optimally in terms of maximum transmission capacity of the random channel and of minimization of the rate of collision on the random channel. The third and fourth steps are respectively replaced by fifth and sixth steps consisting in that:

in the fifth step, as a function of the measurement of the occupancy of the second radio resources currently used by the second system and of the first resources currently used by the first system, the first system determines the first resources in terms of time slots and/or frequency slots and/or access codes to be used by new dual-mode terminals, not located in the coverage of the second system, so as to optimize the transmission capacity of the random channel and to minimize the rate of collision on the random channel; and in the sixth step, the first system notifies, using a signalling channel broadcast on the downlink to the dual-mode terminals involved, not located in the cellular coverage of the second system, the relevant information concerning the first resources to be used and determined in the fifth step.

BRIEF DESCRIPTION OF THE DRAWINGS

The invention will be better understood on reading the following description of several embodiments, given only as examples and with reference to the drawings in which:

FIG. 2 is a partial view of the general architecture of an integrated system according to the invention in which the integrated system comprises a first system and a second system, the coverage level of the first system being higher than the coverage level of the second system, the first system here being a satellite system and the second system being a cellular radio communication system with macro cells;

DETAILED DESCRIPTION

Figure 1:
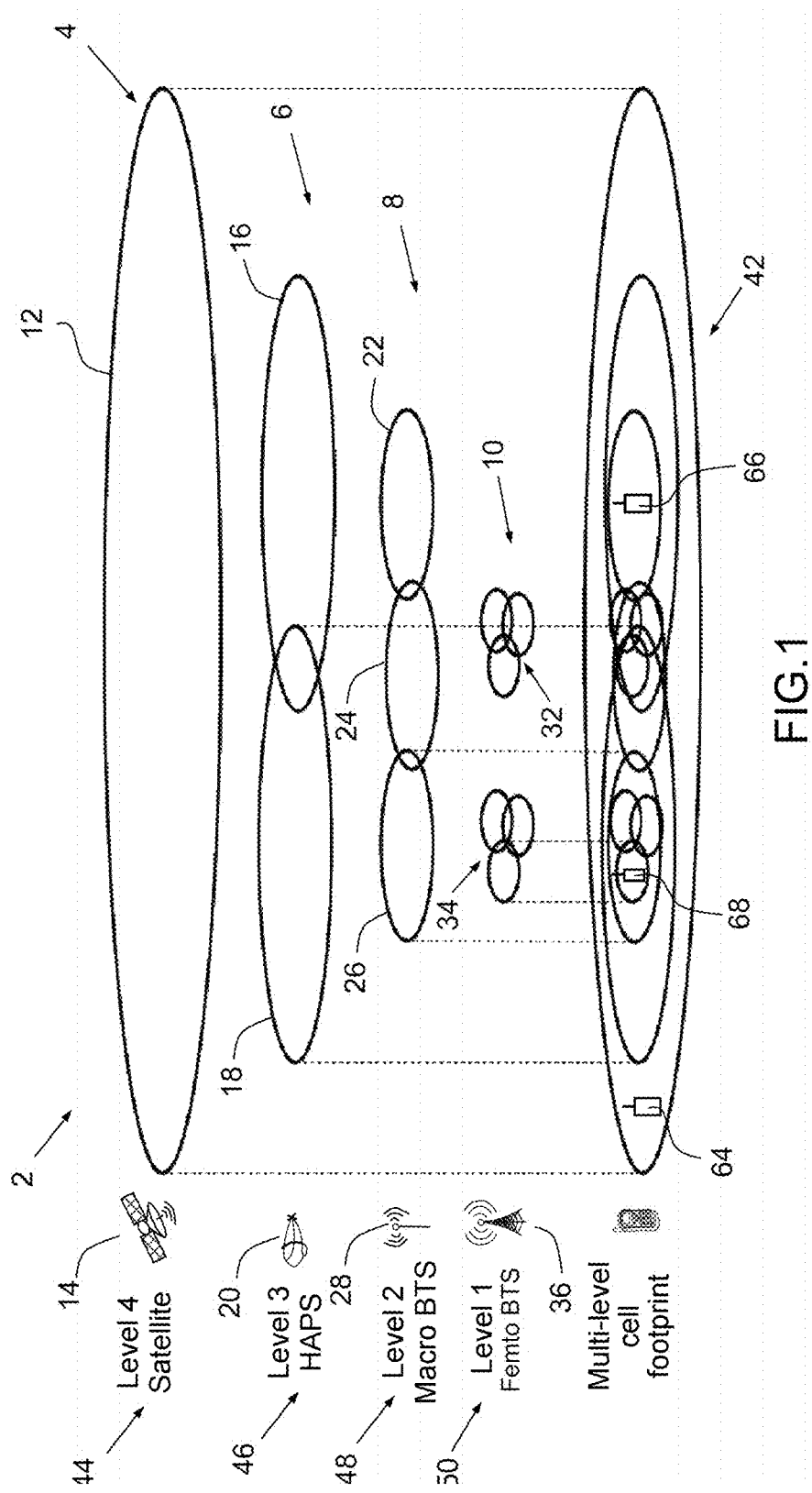
FIG. 1 is a general exploded view of the cellular coverage footprints of different levels of an integrated radio communication system according to the invention with ordered hierarchical cellular coverage, represented in terms of various possible cellular coverage sizes and of possible overlaps between the coverages, the sizes of the cells varying according to the types of systems forming the integrated system.

According to FIG. 1, an integrated radio communication system 2 with ordered hierarchical cellular coverage comprises a plurality of cellular coverage levels 4, 6, 8, 10, here respectively designated by "level 4", "level 3", "level 2", "level 1" looking at FIG. 1 from top to bottom.

The cellular coverage levels are ordered by an integer index, here ranging from 1 to 4, which increases as a function of the size of the cells of the level.

Here, the coverage 4 of level "4" comprises a satellite cell 12 served by a satellite 14 partially forming a level "4" relay station.

The coverage 6 of level "3" here comprises two cells 16, 18 served by one or two high-altitude platform stations HAPS 20, such as, for example, a stratospheric balloon, the size of the cells 16, 18 being compatible with the cone of visibility of the platform station 20 and a platform station 20 partially forming a level "3" relay station.

The coverage of level "2" here comprises three macro cells 22, 24, 26 each served by a "macro" base station 28 BTS, forming a level "2" relay station.

The coverage of level "1" here comprises two clusters 32, 34 each formed by three microcells, each microcell being served by a different base station 36.

According to FIG. 1, the superimposition of the coverages 4, 6, 8, 10 forms a multi-level coverage 42 of the integrated system 2 or a footprint on the ground of multi-level cells.

Here, the cell 12 of the coverage 4 of level "4" covers the HAPS cells 18 and 16 of the coverage 6 of level "3" as an umbrella cell. The two HAPS cells 16, 18 of the coverage 6 of level "3" cover as umbrella cells the three macro cells 22, 24, 26 of the coverage 8 of level "2". The three macro cells 22, 24, 26 of the coverage 8 of level "2" cover as umbrella cells the two clusters 32, 34 of three microcells each of the coverage 10 of level "1".

The cell 12 of the coverage 4 of level "4" is produced and managed by a satellite radio communication system 44 comprising and using at least one satellite in geostationary orbit GSO or non-geostationary orbit (NGSO), here the satellite 14.

The two cells 16, 18 of the coverage 6 of level "3" are produced and managed by an HAPS radio communication system 46 comprising and using at least one high-altitude platform station HAPS, here the stratospheric balloon 20.

The three macro cells 22, 24, 26 of the coverage 8 of level "2" are produced and managed by a cellular radio communication system 48 comprising and using a network of base stations 36 serving as relay stations for the macro cells 22, 24, 26.

The microcells of the two clusters 32, 34 are produced and managed by a cellular radio communication system 50 comprising and using a network of base stations 36 serving as relay stations for the microcells of the two clusters 32, 34.

According to a first configuration, the integrated system 2 comprises a first radio communication system and a second radio communication system, the first system being the satellite radio communication system 44 and the second system comprises one or more systems taken from the systems 46, 48, 50. The first level of coverage associated with the first system, here "4", is higher than any of the coverage levels of a system at least partly forming the second system. A second level of coverage associated with the second system is defined as being the greatest of the levels of coverage of the systems forming the second radio communication system.

According to a second configuration, the integrated system 2 comprises a first radio communication system and a second radio communication system, the first system being the HAPS radio communication system 46 and the second system comprises one or more systems, taken from the macro-cellular radio communication system 48 and the femto-cellular radio communication system 50. The first level of coverage associated with the first system, here "3", is greater than any of the coverage levels of a system forming the second system, and than a second level of coverage, defined as the greater of the levels of coverage of the system or systems 48, 50 forming the second radio communication system.

According to a third configuration, the integrated system 2 comprises a first radio communication system and a second radio communication system, the first system being the macro-cellular radio communication system 48 and the second system being the micro-cellular radio communication system 50. The first level of coverage associated with the first system, here "2", is higher than the second level associated with the second system, here "1".

According to FIG. 1, the integrated system 2 comprises dual-mode or multi-mode terminals, only three of these terminals 64, 66, 68 being represented to simplify FIG. 1. Here, a first terminal 64 and a second terminal 66 are two dual-mode terminals, configured to selectively use the satellite system 44 or the macro-cellular radio system 48. The first terminal 64 is situated in the satellite cell 12 and outside of the cells of lower coverage level or coverage level equal to 3, whereas the second terminal 66 is situated in the macro cell 22. A third terminal 68 is for example a quad-mode terminal configured to selectively use one of the four systems 44, 46, 48, 50 of the integrated system 2 and situated in the cluster 34 of micro cells.

According to FIG. 2 and a generic partial view of an integrated system 102 according to the invention, derived from the system 2 of FIG. 1, the integrated system 102 generally comprises a first radio communication system 104, a second radio communication system 106, and a set 108 of dual-mode terminals 114, 116, configured to selectively use the first system 104 or the second system 106.

The first system 104 has a first level of coverage, designated N1, and a first relay station 124. The second system 106 has a second level of coverage, designated N2, and a second relay station 126.

Without limiting the generality of the invention and in order to simplify FIG. 2, just one first cell 134 of the first system 104 and just one second cell of the second system 106 are represented, the second cell 136 being included geographically in the first cell 134, and only a first terminal 114 and a second terminal 116 are represented, the first terminal 114 being situated in the first cell 134 and outside of the second cell 136, and the second terminal 116 being situated in the second cell 136.

This general representation of FIG. 2 is illustrated by the particular case where the first system 104 is a satellite system like the satellite system 44 of FIG. 1, and where the second system 106 is a macro-cellular radio communication system like the macro-cellular radio communication system 48 of FIG. 1. According to this particular case, the first and second cells 134, 136 of FIG. 2 are for example and respectively the satellite cell 12 and the macro cell 18 of FIG. 1, and the first and second terminals 114, 116 of FIG.

2 are for example and respectively the first and second dual-mode terminals 64, 66 of the integrated system 2 of FIG. 1.

The first relay station 124 is, particularly, the relay station of a satellite component, and it comprises a satellite 142 and an access station 144 to the fixed network 146 of the terrestrial infrastructure. The satellite 142 and the access station 144 are coupled together by a forward broadcast link 148.

According to FIG. 2, the first and second dual-mode terminals 114, 116 are configured to determine the system or component of the integrated system, and the cell of the system to which to attach by observing the propagation conditions and the reception quality of beacon signals broadcast on return links, not represented in FIG. 2, originating from the first and second relay stations 124 and 126.

When a dual-mode terminal receives the beacon from the second relay station 126 of the second cell 136 of the second system 106, it selects, as priority, the second communication system and sets up a communication to route, over a second uplink 156, traffic data to the second relay station 116. Here, the second terminal 116, situated at sufficient range from the second relay station 126, is attached to the second system 106 to transmit on the second uplink 156.

When a dual-mode terminal does not correctly receive the beacon from the second relay station 126 of the second cell 136 of the second system 106, but receives, with sufficient quality, the beacon from the first relay station 124 of the first cell 134 of the first system 104, it selects the first communication system 104 and sets up a communication to route, on a first uplink 158, traffic data to the first relay station 124. Here, the first terminal 116, situated at sufficient range from the second relay station 126 but situated in the coverage area of the first cell 134 of the first system 104 with sufficient range, is attached to the first system 104 to transmit on the first uplink 158.

Generally, and according to a first embodiment, the integrated system 102 according to the invention is characterized in that the first system 104 and the second system 106 are configured to simultaneously share a common portion Bc of a first band B1 of frequencies respectively on the first uplink 158 and the second uplink 156, and respectively manage first transmission resources and corresponding second transmission resources.

Figure 3A:
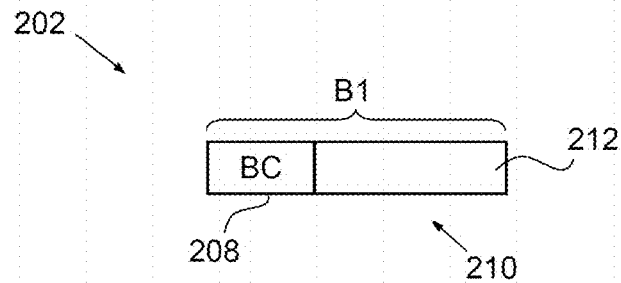
FIGS. 3A and 3B are general views of two examples of frequency plans of the first and second uplinks used respectively by the first and second systems of the invention independently of the existence of a specific band reserved exclusively for the first system.
Figure 3B:
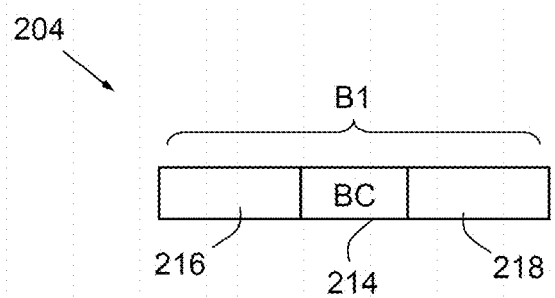

According to FIGS. 3A to 3B, a first example 202 and a second example 204 of frequency plans of the first and second systems 104, 106, taken together, are illustrated.

In the first example of frequency plan 202, a common portion Bc, designated by the reference 208, of frequency band shared by the first and second systems, 104, 106, is included in and situated at a bottom end of a first band B1, designated by the numeric reference 210. The remaining band in a single block and adjacent on the right in FIG. 3A, defines a band 210 dedicated exclusively to the second system 106.

In the second example of frequency plan 204, the common portion Bc, designated by the reference 214, of frequency band shared by the first and second systems 104, 106, is included in the first band B1, and defines, on either side, two framing bands 216, 218, dedicated exclusively to the second system 106. It should be noted that the frequency plans 202, 204 illustrated in FIGS. 3A, 3B encompass the cases of use or absence of a second frequency band B2, different from the first band B1 and dedicated exclusively to the first system 104.

According to FIG. 2, and generally, the second transmission system 106 of lower level N2 is free to manage its second transmission resources without any coordination constraint with respect to the first system 104 of higher level N1.

Furthermore, the first system 104 of higher level N1 is configured to not disturb the second system 106 in the common frequency band portion Bc.

In the integrated system 102, the first system 104 is configured to transmit data packets on a first uplink random access contention channel by using first shared resources, characterized by time slots and/or frequency slots and/or access codes, and to manage the first shared resources optimally in terms of transmission capacity of the channel.

The optimum management of the first shared resources is implemented:

by measuring, on the first relay station, the occupancy of the second radio resources currently used by the second system and of the first shared resources of the common portion of the first band currently used by the first system, then by determining, as a function of the measurement of the occupancy of the second radio resources currently used by the second system and of the first resources currently used by the first system, the first resources in terms of time slots and/or frequency slots and/or access codes to be used by new dual-mode terminals involved so as to optimize the transmission capacity of the random channel; then by notifying, using a signalling channel broadcast on the downlink to the dual-mode terminals involved, not located in the cellular coverage of the second system, the first resources to be used and determined previously.

In a first case, the measurement on the first relay station of the occupancy in terms of energy of the second radio resources currently used by the second system and of the first shared resources of the common portion Bc of the first band B1 currently used by the first system is performed using a first device for measuring the occupancy of the second radio resources and of the first resources both currently used. The occupancy measurement device is configured to determine the average energy received in a plurality of basic frequency channels from a wavelet transform or a Fourier transform of the energy received from a reception coverage beam of the receiving antenna of the first relay station.

In a second case, and optionally complementing the first case, the measurement on the first relay station of the occupancy is performed using a second device for measuring the distribution on all the access codes and all the slots of the energy received from a reception beam of the receiving antenna corresponding to the second radio resources currently used by the second system.

In a third case, when the first relay station is mobile relative to the dual-mode terminals, the first relay station of the first system comprises a device for measuring a geographic distribution of the spectral occupancy received by one or more overlapping beams, determined from a plurality of spectral occupancy profiles measured at different instants along the trajectory and from a predictive model of said trajectory.

Preferably, and according to a second embodiment, derived from the first embodiment, the first system 104 is configured to also manage first additional resources which use a second band B2 of frequencies, different from the first frequency band B1 and reserved exclusively for the first uplink, and which are characterized by time slots and/or frequency slots and/or access codes.

Figure 4A:
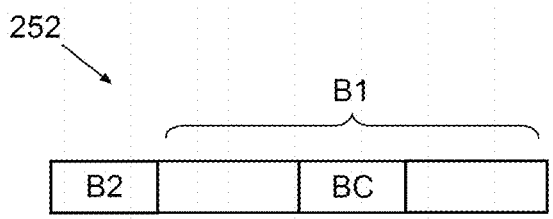
FIGS. 4A and 4B are views, less general than the views of FIGS. 3A and 3B, of two examples of frequency plans of the first and second uplinks, used respectively by the first and second systems of the invention, in which a specific band is reserved exclusively for the first system.
Figure 4B:
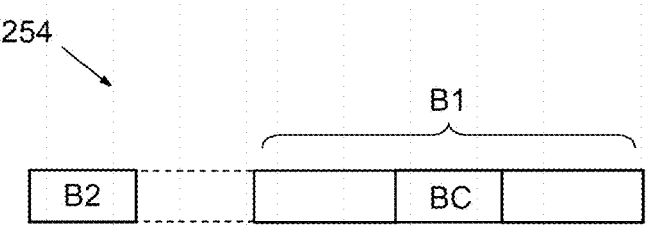

Two examples 252, 254 of frequency plans using a first and a second band B1, B2 are illustrated in FIGS. 4A and 4B. In the example of FIG. 4B, the first and second bands B1 and B2 are adjacent whereas, in the example of FIG. 4B, the first and second bands B1, B2 are separated.

The joint management of the first additional resources of the second band B2 and of the first shared resources of the common portion Bc of the first band B1 is optimal in terms of maximum transmission capacity of the random channel and of minimization of the rate of collision on the random channel.

The optimal and joint management of the first additional resources and of the first shared resources is implemented:

by measuring, on the first relay station, the occupancy in terms of energy of the second radio resources currently used by the second system and of the first shared resources of the common portion of the first band, then by determining, as a function of the measurement of the occupancy in terms of energy of the second radio resources currently used by the second system and of the first resources currently used by the first system, the first resources in terms of time slots and/or frequency slots and/or access codes to be used by new dual-mode terminals involved so as to optimize the transmission capacity of the random channel and to minimize the rate of collision on the random channel; then by notifying, using a return link broadcast channel to the dual-mode terminals involved, not located in the cellular coverage of the second system, the first resources to be used and determined previously.

The first system is configured to distribute the first shared resources of the common portion of the first band and the first additional resources exclusively reserved for the first system so as to minimize the collisions between two terminals accessing the first system via the first uplink by using the same first resource of the first band or of the second band in a cell of first level coverage.

According to a first variant and optionally, the first system is also configured to distribute the first shared resources of the common portion of the first band and the first additional resources exclusively reserved for the first system, so as to minimize the collisions between two terminals accessing, for one of them, the first system via the first uplink and, for the other one, the second system via the second uplink, and both using a same first shared resource of the common portion of the first band.

According to a second variant and optionally, the first system is also configured to distribute the first shared resources of the common portion of the first band and the first additional resources of the second band exclusively reserved for the first system, so as to minimize the indiscriminate collisions of the data packets received on the first uplink, the discrimination method being included in the set formed by:

the general joint maximum likelihood sequence estimation (JMLSE) technique, the general synchronous successive interference cancellation (SIC) technique, which separates two signals as a function of a power difference existing between said two signals, the asynchronous successive interference cancellation technique which separates two signals having the same symbol rate as a function of a time offset by a fraction of a symbol period existing between said signals;

the JMSLE and SIC techniques applied in the case where the contention-based random access protocol uses a contention resolution diversity slotted ALOHA (CRDSA) protocol;

the spatial separation technique when the relay station of the first system comprises an antenna with adaptive electronic scan, determined as a function of the characteristics of the signals received, or with deterministic scan, predetermined as a function of criteria including a date, a geographic position, and a preferred direction of the antenna.

According to a third variant and optionally, the first system comprises a receiver configured to implement a combined processing of the signals originating from a plurality of cells of first level coverage. Furthermore, the first system is configured to distribute the first shared resources of the common portion of the first band and the first additional resources of the second band exclusively reserved for the first system, so as to minimize the indiscriminate collisions of the data packets received by the multi-beam receiver, the discrimination method being based on the difference in received power of the signals originating from different cells of first level coverage, and included in the set formed by:

the general joint maximum likelihood sequence estimation JMLSE technique, the general synchronous successive interference cancellation SIC technique, the asynchronous successive interference cancellation technique, the JMSLE and SIC techniques applied in the case where the contention-based random access protocol uses a contention resolution diversity slotted ALOHA CRDSA protocol; and the spatial separation technique when the relay station of the first system comprises an antenna with electronic scan.

Complementing the third variant, the discrimination method is also based on the difference in time, frequency, power, direction of arrival of the beam of the signals originating from the signals originating from different cells of first level coverage.

According to a fourth variant and optionally, the first and second systems comprise, in common, a receiver configured to implement a combined processing of the signals originating from a cell of first level coverage and from at least one cell of second level coverage. The first system is also configured to distribute the first shared resources of the common portion of the first band and the first additional resources of the second band exclusively reserved for the first system, so as to minimize the indiscriminate collisions of the data packets received by the multi-beam receiver, the discrimination method being based on the difference in time, frequency, power, direction of arrival of the beam, of the signals originating from the cell of first level coverage and from the at least one cell of second level coverage, and included in the set formed by:

the general joint maximum likelihood sequence estimation technique, the general synchronous successive interference cancellation technique, the asynchronous successive interference cancellation technique, the JMSLE and SIC techniques applied in the case where the contention-based random access protocol uses a contention resolution diversity slotted ALOHA CRDSDA protocol; and the spatial separation technique when the relay station of the first system comprises an antenna with electronic scan.

Hereinbelow, the integrated system as described in FIGS. 2, 3A to 3B, 4A to 4B, is an integrated system 302, configured to implement the functionalities of a 5th generation multi-vendor cellular system combining the use of base stations serving cells of micro, even pico and femto cell type, base stations serving cells of macrocell type, high-altitude platform stations HAPS and non-geostationary or geostationary satellite systems. The typical coverages of such a system are those described in FIG. 1.

Hereinbelow, the integrated system 302 exploits architecture and protocol changes in the access network of cellular systems recently developed or currently being developed, namely the fifth generation 5G systems, even the fourth generation 4G systems, and uses the same terminology.

Figure 5:
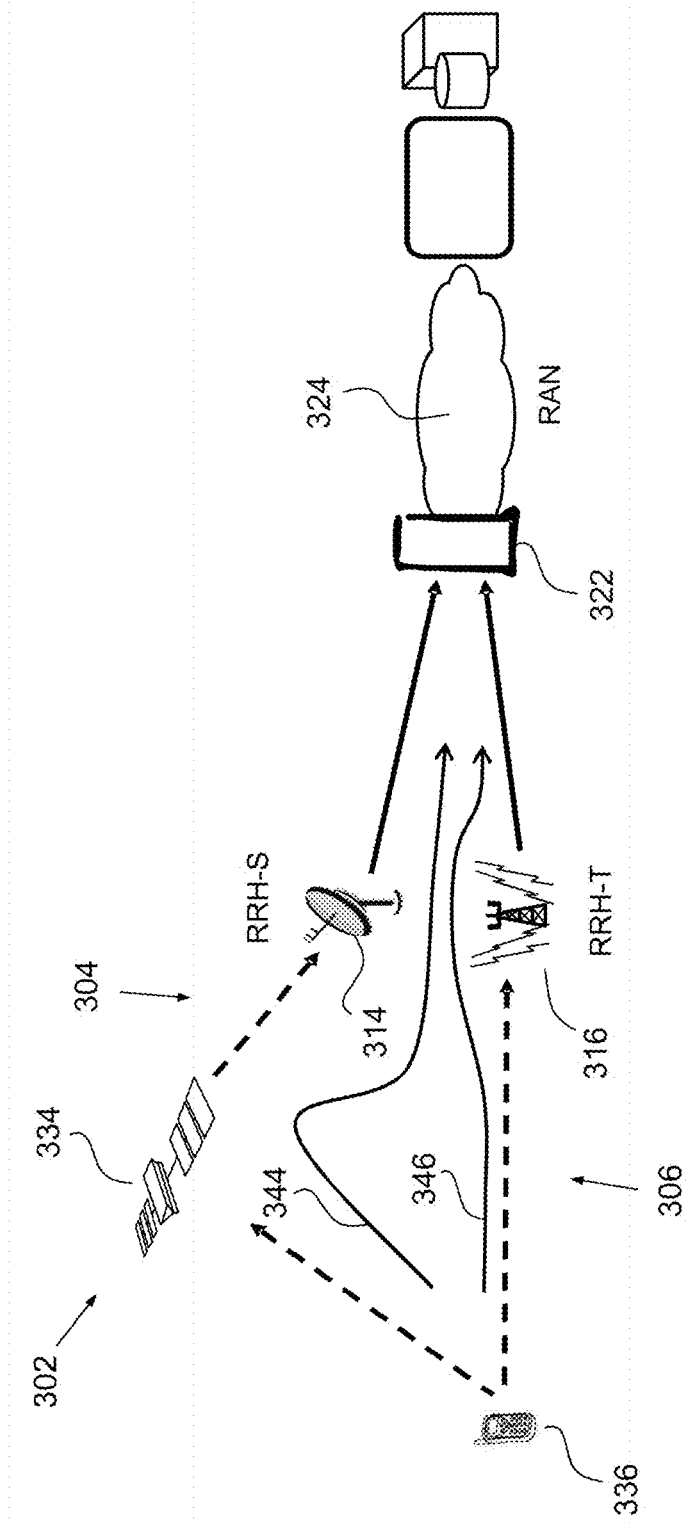
FIG. 5 is a view of an example of an integrated system according to the invention, here using the architectures and the 4G or 5G protocols of an integrated access network, and here comprising a cellular component and a macro-cellular terrestrial component as first and second systems respectively.

According to FIG. 5 partially illustrating an integrated system 302 according to the invention, only a satellite component 304 and a terrestrial cellular component 306 are represented.

In these two components 304, 306, the known architecture of the base stations, called "Node B", and of the radio access network RAN controllers is modified.

The radio stage and the antenna system of each of the base stations are now associated with digital conversion functions in an entity generically called remote radio head RRH and more specifically called RRH-S 314 for the satellite component 304 and RRH-T 316 for a terrestrial cellular component 306.

Each remote radio head RRH 314, 316 is connected to the modem functions, that is to say demodulation, decoding, coding and modulation, grouped together at a control entity 322 of the cloud radio access network 324, designated "cloud" RAN or C-RAN, capable of processing the signals of a plurality of RRHs distributed over a coverage area. Such an architecture makes it possible to make best use of the diversity techniques or MIMO (Multiple Input Multiple Output) techniques to optimize the spectral efficiency, the quality of service QoS and the capacity of the network. Furthermore, the C-RANs can exchange, between them, information in order to combine radio frequency RF signals collected by different remote radio heads RRH that are adjacent or in the immediate vicinity but situated at the boundary between two areas controlled by distinct C-RANs.

The integrated system 302 is configured to supply one-way low bit rate communication services for applications of inter-machine communication type with terminals of very great autonomy.

The space component or the satellite system 304, considered as a first system of the integrated system, is configured to operate in the same frequency bands as the cellular networks, considered as second systems, for example in UHF, L, S or extended C band, without creating interferences or jamming on the terrestrial cellular network or networks. The satellite system 304 constitutes a component of the integrated system 302 which allows an extension of the coverage of the terrestrial cellular networks or systems.

The satellite system 304, based here on satellites 334 in non-geostationary orbit NGSO, is configured to receive the signals transmitted by the cellular terminals 336 in a given area and to retransmit them to the C-RAN in the same format as that used by the terrestrial RRH's.

Typically, the satellite system is configured through its satellites to generate a set of beams whose footprint constitutes a set of space or satellite cells.

The signals transmitted by all the terminals situated in a satellite cell are therefore collected by a satellite 334 of the satellite system and retransmitted by broadcast to all the satellite remote radio heads RRH-S 314 distributed in this satellite cell. The C-RAN 322 or the C-RANs attached to the terrestrial RRH's (RRH-T) 316 and to the satellite RRH's (RRH-S) 314 of the satellite cell are configured to combine the signals collected through the various terrestrial RRH's and those collected by satellite through the at least one satellite RRH by taking into account the difference in delay between two routing paths 344, 346 of the signals to the C-RAN 322, a first path 346 transmitting through a terrestrial RRH-T 316 and a second path 344 transmitting through a satellite RRH-S 314.

In a satellite cell having a high density of terrestrial remote radio heads RRH-T, the contribution added by the satellite component is low because the C-RAN in this case has many terrestrial components via the RRH-T's of a signal transmitted by a cellular terminal.

In a satellite cell having a low density of terrestrial remote radio heads RRH-T, for example in a rural area, the satellite component makes it possible to seamlessly complete the coverage of one or more terrestrial cellular components.

In a satellite cell that has no remote radio head, either satellite or terrestrial, for example in an isolated desert or ocean area, the satellite component is the sole means of collecting the signals transmitted by the cellular terminals. It will be relayed by a plurality of inter-satellite links ISL to a satellite remote radio head RRH-S situated in another satellite cell.

In a variant, the satellite system is replaced by an HPAS system based on HAPS's.

Figure 6:
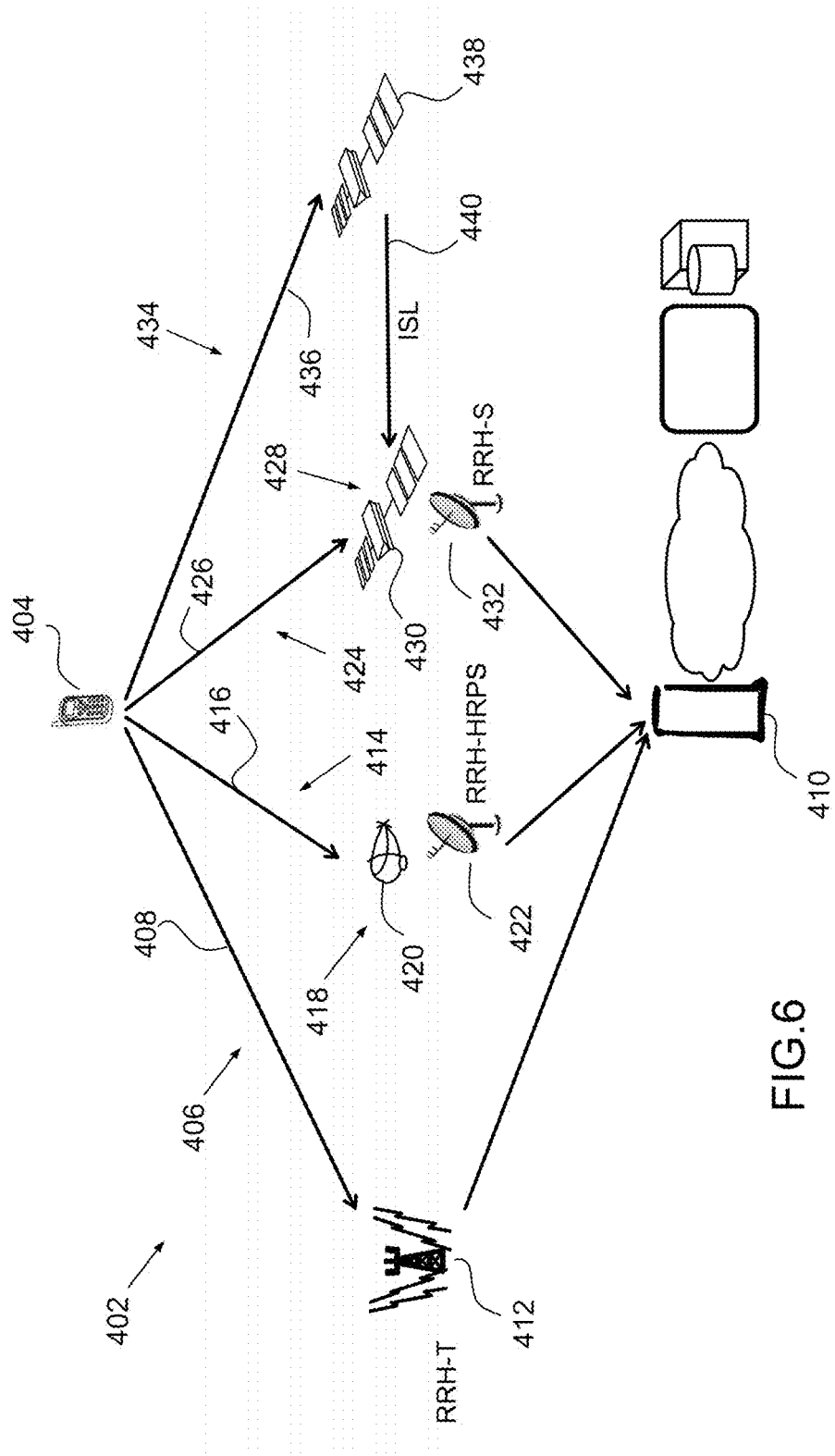
FIG. 6 is a panoramic view of the integrated system of FIG. 5 making it possible to identify environment scenarios of a terminal and the associated system components allowing for the better routing of a signal transmitted by the terminal in the integrated system.

According to FIG. 6 and a panoramic representation 402 for identifying, according to the environment of the terminal 404, systems or components of the integrated system used as main transmission component, four types of environments of the terminal condition the choice of a component or of a system of the integrated system.

In the case 406 where the terminal 404 is located in an area having a high density of terrestrial remote radio heads RRH-T, in particular an urban area the transmission uplink 408 which predominantly contributes to the good reception by the controller C-RAN 410 is that which transits through a base station or terrestrial remote radio head 412.

In the case 414 where the terminal 404 is located in an area in which a particular event has occurred, for example a natural disaster which has destroyed the everyday telecommunication infrastructure in the area, the transmission uplink 416 which predominantly contributes to the good reception by the controller C-RAN 410 is that, offered by an HAPS system deployed for this event, which transits through an HAPS relay station 418, formed by an HPAS platform 420 and an associated radio head RRH 422.

In the case 424 where the terminal 404 is located in a region mostly made up of rural areas, the transmission uplink 426 which predominantly contributes to the good reception by the controller C-RAN 410 is that, offered by a satellite system, which transits through a satellite relay station 428, formed by a satellite 430 and an associated satellite remote radio head RRH-S 432.

In the case 434 where the terminal 404 is located in an isolated area, for example a desert or an ocean area far from the coasts, the transmission uplink 436 which predominantly contributes to the good reception by the controller C-RAN 410 is that, offered by a satellite system, which transits through at least one first satellite 438, one or more intersatellite links ISL 440, and a second satellite relay station, here, for convenience of representation in FIG. 6, the satellite relay station 428, formed by the satellite 430 and the associated satellite remote radio head RRH-S 432.

Generally, a cellular dual-mode terminal of an integrated system 302 is configured to transmit, among other signals, a signal containing information such as the identity of the terminal or of the user of the terminal, the position of the terminal when the latter is equipped with a GNSS (Global Navigation Satellite System) receiver, and status and/or measurement reports concerning the operation of the GNSS sensor with which the terminal is coupled.

A dual-mode cellular terminal of the integrated system 302 according to the invention is configured to transmit a signal in three ways.

In a first configuration, the dual-mode terminal is synchronised on a signalling beacon supplied by one of the terrestrial cellular networks and can transmit in a contention-based random access channel which has been indicated to it by the network.

In a second configuration, the terrestrial cellular network has assigned to the terminal a second radio resource of the band dedicated exclusively to the terrestrial cellular network or a second radio resource of the shared band portion. To use the general terminology of the invention, the terrestrial cellular network considered as a second system has assigned a second resource of the first band B1 according to a DAMA (Demand Assigned Multiple Access) mode.

In a third configuration, the terminal does not receive any signal from a terrestrial cellular network. In this case, the terminal is programmed to transmit in a random access channel of the satellite system using the shared band portion of the first band and/or a second band dedicated exclusively to the access uplink of the satellite system. As examples of random access transmission techniques, protocols of slotted ALOHA, contention resolution diversity slotted ALOHA or CRDSA, or spread spectrum ALOHA type relying on its internal clock or on a clock derived from a GNSS receiver can be used. The first resources of the random channel can be prescribed directly or be able to be determined from information broadcast on a return channel of the satellite component.

Figure 7:
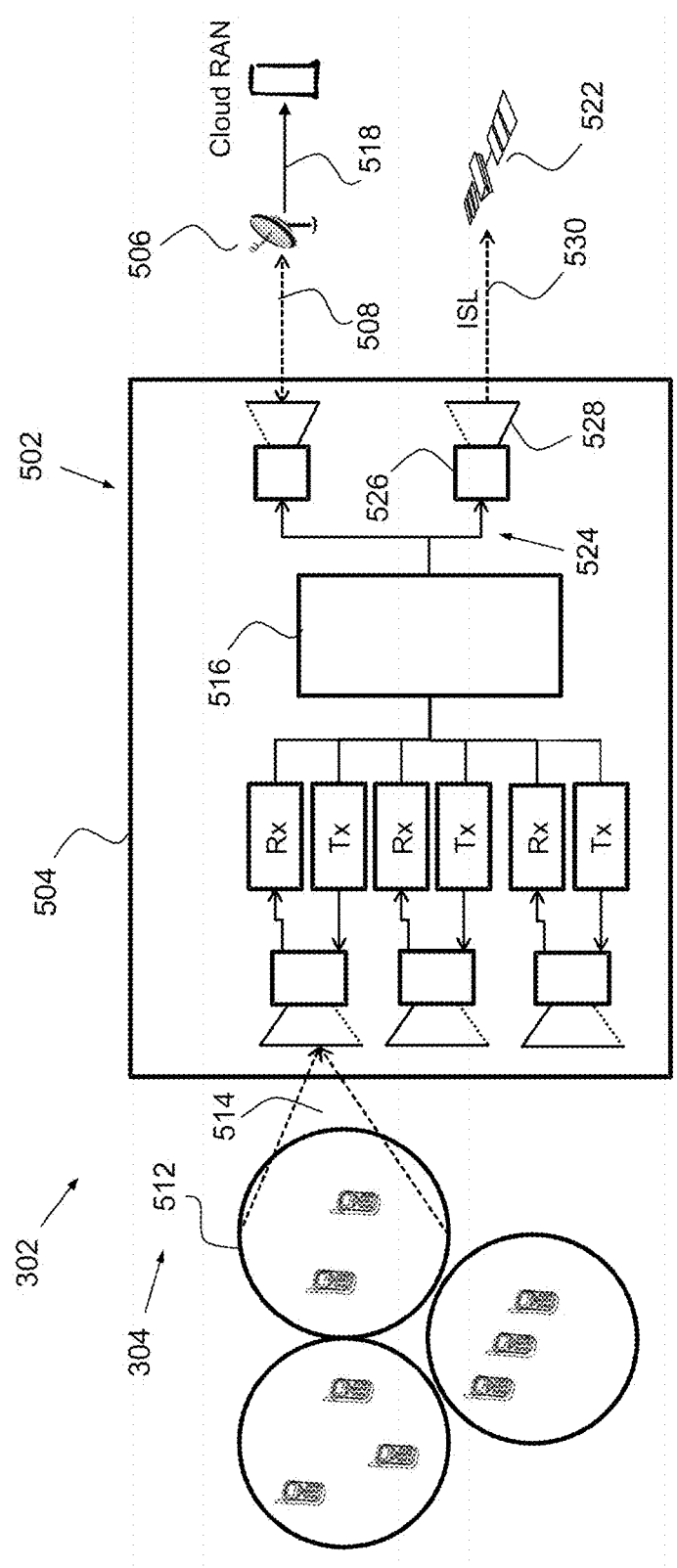
FIG. 7 is a view of the integrated system of FIG. 5 which details the architecture of the satellite of the space component.

According to FIG. 7 and a typical architecture of a satellite relay station 502 of the satellite component 304 of the system 302, the satellite relay station 502 comprises a satellite 504 and at least one satellite remote radio head RRH-S 506, connected to the satellite 504 through a two-way link 508 for accessing the network of the terrestrial infrastructure.

The satellite relay station 502 is configured to digitize an aggregate of signals originating from one and the same satellite cell 512 and received in an associated beam 514 of the first uplink of the satellite 504 and generate a data stream to the C-RANs in the same format as the RRH's.

The digitization can be done onboard the satellite 504 using a digital processor or directly in the satellite remote radio heads RRH-S 506.

The digitized stream is set to an optical digital radio over fibre 518 D-RoF format defined according to protocols such as CPRI (Common Public Radio Interface) or OBSA (Open Base Station Architecture Initiative).

The satellite 504 is configured to route an aggregate of signals originating from one and the same satellite cell to another satellite 522 through a transponder channel 524, connected at the output to a transmitter 526 and an antenna 528 of an inter-satellite link 530, when the satellite cell has no RRH as for example in the case of a coverage of an ocean area far from the coasts.

Generally, the following configurations of the integrated system can be produced:
an RRH-S is configured to receive signals transmitted by a plurality of terminals distributed in one or more satellite cells, and collected by one or more satellites;
an RRH-T is configured to collect signals transmitted by a plurality of terminals distributed in a cell;
a controller C-RAN is configured to process signals from a plurality of RRH-T's and RRH-S's;
an RRH-T or RRH-S is configured to be connected to one or more C-RAN controllers.

Figure 8:
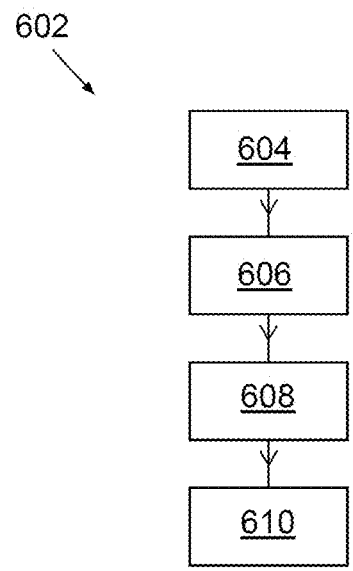
FIG. 8 is a first embodiment of a cellular radio communication method implemented by an integrated system as described by one of FIGS. 1, 2 and 5 to 7.

According to FIG. 8, a cellular radio communication method 602 is implemented by an integrated radio communication system with ordered hierarchical cellular coverage in which a cell of higher level coverage covers one or more cells of lower level.

The integrated radio communication system comprises:
a first radio communication system having a first coverage level and a first relay station and at least one second radio communication system having a second coverage level and a second relay station, the first coverage level being higher than the second coverage level; and
a set of dual-mode terminals, configured to selectively use the first system or the second system;
the first system and the second system being configured to simultaneously share a common portion of a band of frequencies respectively on a first uplink and a second uplink, and respectively manage first transmission resources and corresponding second transmission resources;
the second transmission system of lower level being free to manage its second transmission resources without any coordination constraint with respect to the first system of higher level, and
the first system of higher level being configured to not disturb the second system in the common frequency band portion.

The radio communication method 602 comprises a set of first, second, third and fourth steps 604, 606, 608 and 610.

In the first step 604, a first set of dual-mode terminals, connected to the first system, transmit data packets on a first uplink random access contention channel by using first resources of the shared portion of the first band. In parallel, a second set of terminals, connected to the second system, use second resources of the shared portion of the first band.

Then, in the second step 606, the first system measures, on the first relay station, the occupancy of the second radio resources currently used by the second system and of the first radio resources currently used by the first system.

Next, in the third step 608, based on the measurement of the occupancy of the second radio resources currently used by the second system and of the first resources currently used by the first system, the first system determines the first resources in terms of time slots and/or frequency slots and/or access codes to be used by new dual-mode terminals which want to do so, so as to optimize the transmission capacity of the random channel.

Then, in the fourth step 610, the first system notifies, using a signalling channel broadcast on the downlink to the dual-mode terminals involved, the relevant information concerning the first resources to be used and determined in the third step 608.

Figure 9:
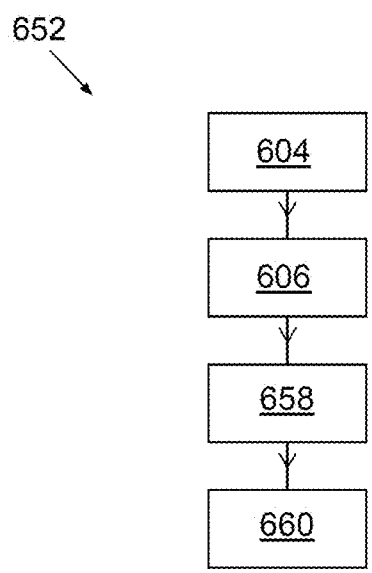
FIG. 9 is a second embodiment of a cellular radio communication method implemented by an integrated system as described by one of FIGS. 1, 2 and 5 to 7.

According to FIG. 9 and a second embodiment of the method, an integrated cellular radio communication method 652, derived from the integrated cellular radio communication method 602, comprises the same first and second steps 604, 606.

The integrated method 652 differs from the integrated method 602 in that, upon its implementation, the first system is configured to manage first additional resources using a second band of frequencies reserved exclusively for the first uplink and the first shared resources of the common portion of the first band, characterized by time slots and/or frequency slots and/or access codes, optimally in terms of maximum transmission capacity of the random channel and of minimization of the rate of collision on the random channel.

The integrated method 652 differs also from the integrated method 602 in that the third and fourth steps are respectively replaced by fifth and sixth steps 658, 660.

In the fifth step 658, based on the measurement of the occupancy of the second radio resources currently used by the second system and of the first resources currently used by the first system, the first system determines the first resources in terms of time slots and/or frequency slots and/or access codes to be used by new dual-mode terminals involved so as to optimize the transmission capacity of the random channel and to minimize the rate of collision on the random channel.

In the sixth step 660, the first system notifies, using a signalling channel broadcast on the downlink to the dual-mode terminals involved, not located in the cellular coverage of the second system, the relevant information concerning the first resources to be used and determined in the fifth step 658.

It should be noted that, after one of the steps 610 in FIG. 8, 660 in FIG. 9, of notification to the dual-mode terminals involved of the relevant information concerning the first resources to be used, the dual-mode terminals will also be able to select, according to their geographic position, transmission resources out of the notified first resources to be used and use them.

The integrated systems 2, 102, 302 according to the invention as described above thus make it possible to carry out a seamless coverage extension with no hardware impact on the cellular terminals.

Advantageously, the integrated system according to the invention is compatible with different types of satellites or HAPS according to the sizes of the coverages to be processed for the collection of the signals originating from the cellular terminals.

Thus, satellites in non-geostationary orbit NGSO, included in the range of satellites ranging from nano-satellites to mini-satellites through macro-satellites, can be used with nongeostationary satellite cells on the ground.

Similarly, platforms of HAPS type, in particular stratospheric balloons, can be used with fixed HAPS cells on the ground.

In the case of a constellation of NGSO satellites, it is possible to provide a progressive deployment of the constellation. Initially, the coverage extension area will be limited and intermittent.

The first and second systems are configured to route sporadic data traffic for machine-to-machine communication applications.

The invention claimed is:

1. An integrated radio communication system with ordered hierarchical cellular coverage in which a cell of higher level coverage covers one or more cells of lower level, said integrated system comprising:
   a first radio communication system having a first coverage level N1 and a first relay station and a second radio communication system having a second coverage level N2 and a second relay station, the first coverage level N1 being higher than the second coverage level N2; and
   a set of dual-mode terminals configured to selectively use the first system or the second system;
   said integrated system wherein
      the first system and the second system are configured to simultaneously share a common portion Bc of a first frequency band B1 respectively on a first uplink for access to the first relay station and a second uplink for access to the second relay station, and respectively manage first shared transmission resources and second transmission resources which use the common portion Bc of the first band B1;
      the second transmission system of lower level N2 being free to manage its second transmission resources without any coordination constraint with respect to the first system of higher level N1, and
      the first system of higher level N1 being configured to not disturb the second system in the common frequency band portion Bc;
   said integrated system wherein
      the first system is configured to transmit data packets on a first uplink random access contention channel and to manage its first resources on said random channel, characterized by time slots and/or frequency slots and/or access codes, optimally in terms of transmission capacity of the random channel,
      by measuring, at the first relay station, the transmission resource occupancy of the second radio resources currently used by the second system and of the first shared resources currently used by the first system, then
      by determining, as a function of the measurement of the occupancy of the second radio resources currently used by the second system and of the first shared resources currently used by the first system, the shared first resources, in terms of time slots and/or frequency slots and/or access codes, to be used by new dual-mode terminals not located in the cellular coverage of the second system, so as to optimize the transmission capacity of the random channel; then
      by notifying, using a signalling channel broadcast on a downlink to the dual-mode terminals, not located in the cellular coverage of the second system, the first resources to be used and determined previously.

2. The integrated radio communication system with ordered hierarchical cellular coverage according to claim 1, wherein the first relay station of the first system comprises:
   a device for measuring the spectral occupancy of the second radio resources currently used by the second system, by determining the average energy received in a plurality of basic frequency channels from a wavelet transform or a Fourier transform of the energy received from a beam of reception-mode coverage of the receiving antenna of the first relay station; and/or
   a device for measuring the distribution, over all the access codes and all the slots, of the energy received from a reception beam of the receiving antenna corresponding to the second radio resources currently used by the second system.

3. The integrated radio communication system with ordered hierarchical cellular coverage according to claim 1, wherein, when the first relay station is mobile relative to the dual-mode terminals, the first relay station of the first system comprises:
   a device for measuring a geographical distribution of the spectral occupancy received by one or more overlapping reception beams, determined from a plurality of spectral occupancy profiles measured at different instants along the trajectory and from a predictive model of said trajectory.

4. The integrated radio communication system with ordered hierarchical cellular coverage according to claim 1, wherein
   the first system is configured to manage first additional resources using a second band B2 of frequencies reserved exclusively for the first uplink and the first shared resources using the common portion Bc of the first band B1, characterized by time slots and/or frequency slots and/or access codes, optimally in terms of maximum transmission capacity of the random channel and of minimization of the rate of collision on the random channel, by measuring, on the first relay station, the occupancy of the second radio resources currently used by the second system and of the first shared resources currently used by the first system, then by determining, as a function of the measurement of the occupancy of the second radio resources currently used by the second system and of the first shared resources currently used by the first system, the first resources in terms of time slots and/or frequency slots and/or access codes to be used by new dual-mode terminals, not located in the cellular coverage of the second system, so as to optimize the transmission capacity of the random channel and to minimize the rate of collision on the random channel; then by notifying using the signalling channel broadcast on the downlink to the dual-mode terminals, not located in the cellular coverage of the second system, the first resources to be used and determined previously.

5. The integrated radio communication system with ordered hierarchical cellular coverage according to claim 4, wherein the first system is configured to distribute the first shared resources of the common portion of the first band and the first additional resources exclusively reserved for the first system, so as to minimize the collisions between two terminals accessing the first system via the first uplink by using the same first resource of the first band or of the second band in a cell of first level coverage.

6. The integrated radio communication system with ordered hierarchical cellular coverage according to claim 4, wherein the first system is configured to distribute the first shared resources of the common portion of the first band and the first additional resources exclusively reserved for the first system, so as to minimize the collisions between two terminals accessing, for one of them, the first system via the first uplink and, for the other one, the second system via the second uplink, and all using the same first shared resource of the common portion of the first band.

7. The integrated radio communication system with ordered hierarchical cellular coverage according to claim 4, wherein the first system is configured to distribute the first shared resources of the common portion of the first band and the first additional resources of the second band exclusively reserved for the first system, so as to minimize the indiscriminate collisions of the data packets received on the first uplink, the discrimination method being included in the set formed by the general joint maximum likelihood sequence estimation technique, the general synchronous successive interference cancellation technique which separates two signals as a function of a power difference existing between said two signals, the asynchronous successive interference cancellation technique which separates two signals having the same symbol rate as a function of a time offset by a fraction of a symbol period existing between said signals;

the JMSLE and SIC techniques applied in the case where the contention-based random access protocol uses a contention resolution diversity slotted ALOHA protocol;

the spatial separation technique when the relay station of the first system comprises an antenna with adaptive electronic scan, determined as a function of the characteristics of the signals received, or with deterministic scan, predetermined as a function of criteria including a date, a geographical position, and a preferred direction of the antenna.

8. The integrated radio communication system with ordered hierarchical cellular coverage according to claim 4, wherein the first system comprises a receiver configured to implement a combined processing of the signals originating from a plurality of cells of first level coverage, and the first system is configured to distribute the first shared resources of the common portion of the first band and the first additional resources of the second band exclusively reserved for the first system, so as to minimize the indiscriminate collisions of the data packets received by the multi-beam receiver, the discrimination method being based on the difference in received power of the signals originating from different cells of first level coverage, and included in the set formed by the general joint maximum likelihood sequence estimation technique, the general synchronous successive interference cancellation technique, the asynchronous successive interference cancellation technique, the JMSLE and SIC techniques applied in the case where the contention-based random access protocol uses a contention resolution diversity slotted ALOHA protocol; and the spatial separation technique when the relay station of the first system comprises an antenna with electronic scan.

9. The integrated radio communication system with ordered hierarchical cellular coverage according to claim 8, wherein the discrimination method is also based on the difference in time, frequency, power, direction of arrival of the beam of the signals originating from the signals originating from different cells of first level coverage.

10. The integrated radio communication system with ordered hierarchical cellular coverage according to claim 4, wherein the first and second systems comprise, in common, a receiver configured to implement a combined processing of the signals originating from a cell of first level coverage and from at least one cell of second level coverage and the first system is configured to distribute the first shared resources of the common portion of the first band and the first additional resources of the second band exclusively reserved for the first system, so as to minimize the indiscriminate collisions of the data packets received by the multi-beam receiver, the discrimination method being based on the difference in time, frequency, power, direction of arrival of the beam, of the signals originating from the cell of first level coverage and from the at least one cell of second level coverage, and included in the set formed by the general joint maximum likelihood sequence estimation technique, the general synchronous successive interference cancellation technique, the asynchronous successive interference cancellation technique, the JMSLE and SIC techniques applied in the case where the contention-based random access protocol uses a contention resolution diversity slotted ALOHA protocol; and the spatial separation technique when the relay station of the first system comprises an antenna with electronic scan.

11. The integrated radio communication system with ordered hierarchical cellular coverage according to claim 1, wherein the first and second systems are configured to route sporadic data traffic for inter-machine communication applications.

12. The integrated radio communication system with ordered hierarchical cellular coverage according to claim 1, wherein the first system is a satellite radio communication system comprising and using at least one satellite in geostationary orbit or non-geostationary orbit, and the second system is a radio communication system comprising one or more networks of relay stations out of the high-altitude platform stations, the base stations serving macro cells, the base stations serving micro, pico or femto cells; or the first system is a high-altitude radio communication system comprising and using at least high-altitude platform stations, and the second system is a cellular radio communication system comprising one or more networks of relay stations out of the base stations serving macro cells, the base stations serving micro, pico or femto cells; or the first system is a cellular radio communication system comprising one or more networks of relay stations included among the base stations serving macro cells, and the second system is a cellular radio communication system comprising one or more networks of relay stations included among the base stations serving micro, pico or femto cells.

13. The integrated radio communication system with ordered hierarchical cellular coverage according to claim 1, wherein the first system is a satellite radio communication system comprising and using a constellation of satellites moving in low earth orbits.

14. The integrated radio communication system with ordered hierarchical cellular coverage according to claim 1, configured to implement the functionalities of a 5th generation multi-vendor radio communication system combining the use of base stations serving cells out of the micro, pico and femto cells, base stations serving cells of macro cell type, high-altitude platform stations and non-geostationary or geostationary satellite systems.

15. A cellular radio communication method, implemented by an integrated radio communication system with ordered hierarchical cellular coverage, wherein a cell of higher level coverage covers one or more cells of lower level, the integrated radio communication system comprising:

a first radio communication system having a first coverage level N1 and a first relay station and a second radio communication system having a second coverage level N2 and a second relay station, the first coverage level N1 being higher than the second coverage level N2; and a set of dual-mode terminals, configured to selectively use the first system or the second system;

the first system and the second system being configured to simultaneously share a common portion Bc of a first band B1 of frequencies respectively on a first uplink for access to the first relay station and a second uplink for access to the second relay station, and respectively manage first shared transmission resources and second transmission resources which use the common portion Bc of the first band B1;

the second radio communication system of lower level being free to manage its second transmission resources without any coordination constraint with respect to the first system of higher level, and the first system of higher level N1 being configured to not disturb the second system in the common portion Bc of the common frequency band;

said radio communication method comprising the steps wherein in a first step, a first set of dual-mode terminals connected to the first system transmit data packets on a first uplink random access contention channel by using first shared resources of the common portion Bc of the first band, and a second set of terminals, connected to the second system, use second resources of the common portion of the first band B1; then in a second step, the first system measures, on the first relay station, the occupancy of the second radio resources currently used by the second system and of the first shared resources currently used by the first system; then in a third step, as a function of the measurement of the occupancy of the second radio resources currently used by the second system and of the first shared resources currently used by the first system, the first system determines the first shared resources, in terms of time slots and/or frequency slots and/or access codes, to be used by new dual-mode terminals not located in the coverage of the second system so as to optimize the transmission capacity of the random channel; then in a fourth step, the first system notifies, using a signalling channel broadcast on the downlink to the dual-mode terminals, not located in the coverage of the second system, the relevant information concerning the first resources to be used and determined in the third step.

16. The cellular radio communication method according to claim 15, wherein the first system is configured to manage first additional resources using a second band B2 of frequencies reserved exclusively for the first uplink and the first shared resources using the common portion Bc of the first band B1, characterized by time slots and/or frequency slots and/or access codes, optimally in terms of maximum transmission capacity of the random channel and of minimization of the rate of collision on the random channel, and the third and fourth steps are respectively replaced by fifth and sixth steps wherein in the fifth step, as a function of the measurement of the occupancy of the second radio resources currently used by the second system and of the first resources currently used by the first system, the first system determines the first resources in terms of time slots and/or frequency slots and/or access codes to be used by new dual-mode terminals, not located in the coverage of the second system, so as to optimize the transmission capacity of the random channel and to minimize the rate of collision on the random channel; and in the sixth step, the first system notifies, using a signalling channel broadcast on the downlink to the dual-mode terminals, not located in the cellular coverage of the second system, the relevant information concerning the first resources to be used and determined in the fifth step.

* * * * *